United States Patent [19]

Bopp

[11] Patent Number: 4,790,792
[45] Date of Patent: Dec. 13, 1988

[54] TORSION DAMPING ASSEMBLY

[75] Inventor: Warren G. Bopp, Farmington Hills, Mich.

[73] Assignee: Eaton Corporation, Cleveland, Ohio

[21] Appl. No.: 564,537

[22] Filed: Dec. 22, 1983

[51] Int. Cl.[4] .......................... F16D 3/12; F16D 3/80
[52] U.S. Cl. ................................ 464/66; 192/58 B;
192/106.1; 192/106.2; 464/24; 464/97
[58] Field of Search ................ 192/106.1, 106.2, 58 B,
192/70.17, 70.18, 3.28, 3.29, 3.30, 3.31, 3.33;
464/24, 62, 64, 66, 97; 74/574; 188/140.1, 266, 290, 293

[56] References Cited

U.S. PATENT DOCUMENTS

| | | |
|---|---|---|
| 1,978,922 | 10/1934 | Wemp . |
| 2,507,999 | 5/1950 | Schjolin ................. 192/3.5 |
| 2,838,955 | 6/1958 | Burch ..................... 74/574 |
| 3,159,987 | 12/1964 | Thompson et al. . |
| 3,227,254 | 1/1966 | Sutaruk .................. 188/290 X |
| 3,385,408 | 5/1968 | Manning ................. 188/290 X |
| 3,495,475 | 2/1970 | Rumsey ................... 74/574 |
| 3,512,612 | 5/1970 | Bragg et al. ............. 188/266 X |
| 3,536,175 | 10/1970 | Kawabe et al. ........... 192/58 B |
| 3,584,716 | 6/1971 | Coty ..................... 192/58 B |
| 3,678,782 | 7/1972 | Aoki ..................... 74/574 |
| 3,977,502 | 8/1976 | Chana .................... 192/3.3 |
| 4,013,154 | 3/1977 | Brown .................... 192/58 |
| 4,051,936 | 10/1977 | Crisenbery et al. ....... 192/58 B |
| 4,082,139 | 4/1978 | Davis .................... 267/136 X |
| 4,138,003 | 2/1979 | Malloy ................... 192/3.29 |
| 4,148,200 | 4/1979 | Schallhorn et al. . |
| 4,160,390 | 7/1979 | Spaetgens ................ 74/574 |
| 4,181,208 | 1/1980 | Davis .................... 192/106.1 |
| 4,194,604 | 3/1980 | Nichols et al. .......... 192/3.3 |
| 4,212,380 | 7/1980 | Billet ................... 192/106.2 |
| 4,279,132 | 7/1981 | Lamarche ................. 192/106.2 X |
| 4,302,951 | 12/1981 | Fall et al. .............. 192/106.2 X |
| 4,317,510 | 3/1982 | Staub, Jr. ............... 192/48.3 |
| 4,351,167 | 9/1982 | Hanke et al. ............. 464/24 |
| 4,360,352 | 11/1982 | Lamarche ................. 464/64 |
| 4,368,807 | 1/1983 | McLean et al. ............ 74/574 X |
| 4,398,436 | 4/1980 | Fisher ................... 74/688 |
| 4,557,357 | 12/1985 | Tinholt .................. 192/106.2 X |
| 4,565,273 | 1/1986 | Tojima et al. ............ 192/106.1 X |
| 4,601,676 | 7/1986 | Tojima et al. ............ 464/24 |

FOREIGN PATENT DOCUMENTS

| | | | |
|---|---|---|---|
| 2823894 | 5/1977 | Fed. Rep. of Germany ........ 464/64 |
| 2813002 | 9/1979 | Fed. Rep. of Germany . |
| 650746 | 2/1951 | United Kingdom .................. 74/574 |
| 2099091A | 12/1982 | United Kingdom . |
| 8101731 | 6/1981 | World Int. Prop. O. ............ 74/574 |

Primary Examiner—Rodney H. Bonck
Attorney, Agent, or Firm—P. S. Rulon

[57] ABSTRACT

A torsion damping assembly includes a spring or spring assemblies (20 or 108,110) and a viscous damper (22 or 106) adapted to be installed between input and output drives of a vehicle driveline. In one embodiment of the assembly the spring (22) is a torsion shaft. In the other embodiment (100) a housing member or assembly (112) contains the spring assemblies (108,110) and the viscous damper (106). The spring assemblies (108,110) are disposed in parallel relative and each assembly includes a plurality of helical coil springs (136) disposed in series.

6 Claims, 5 Drawing Sheets

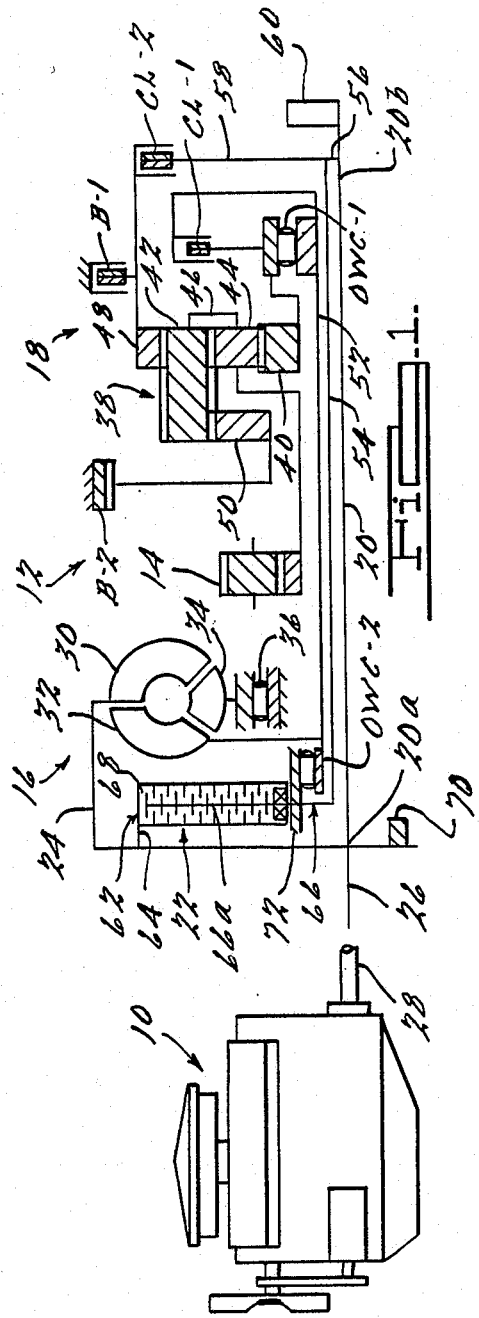

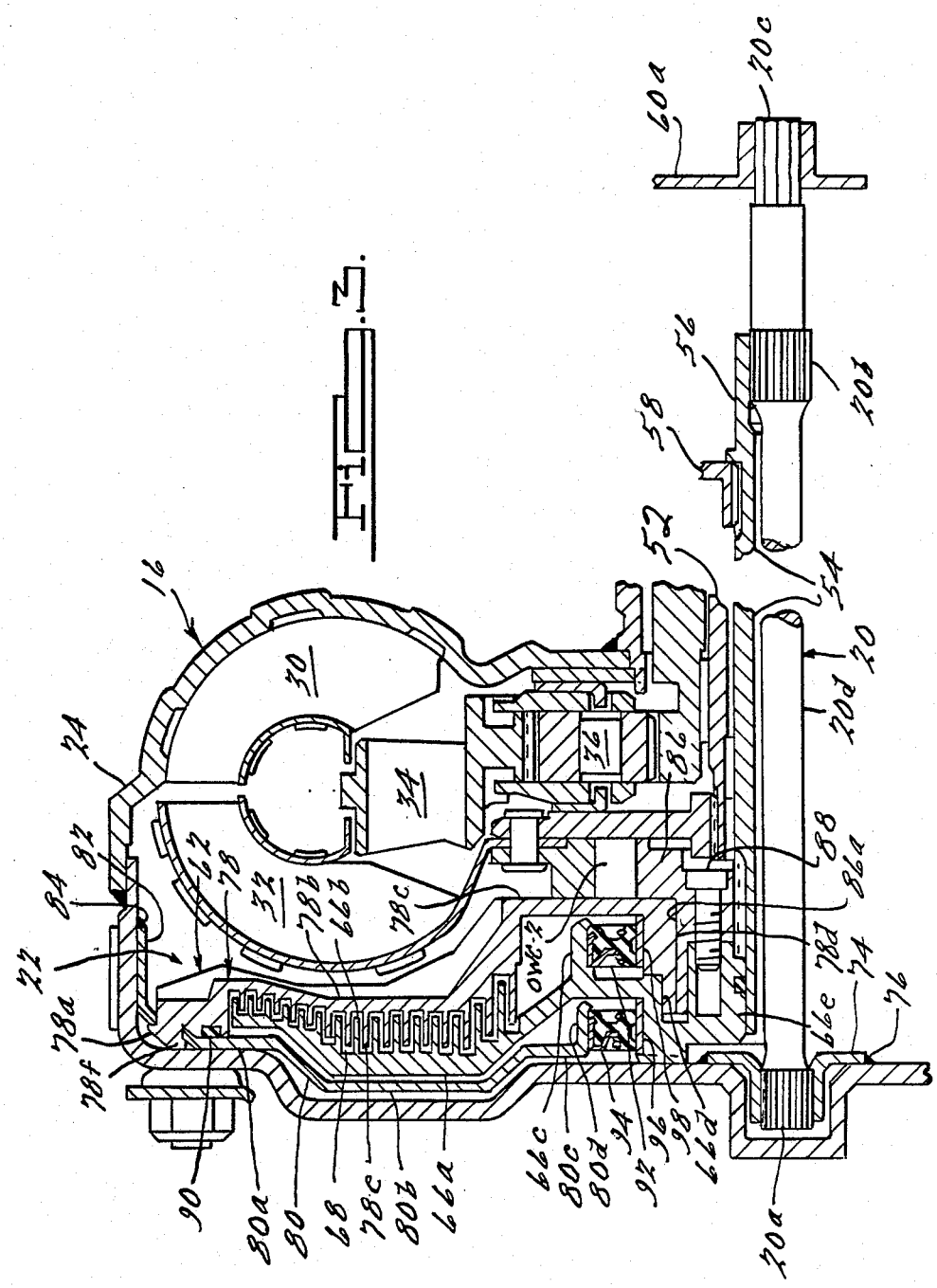

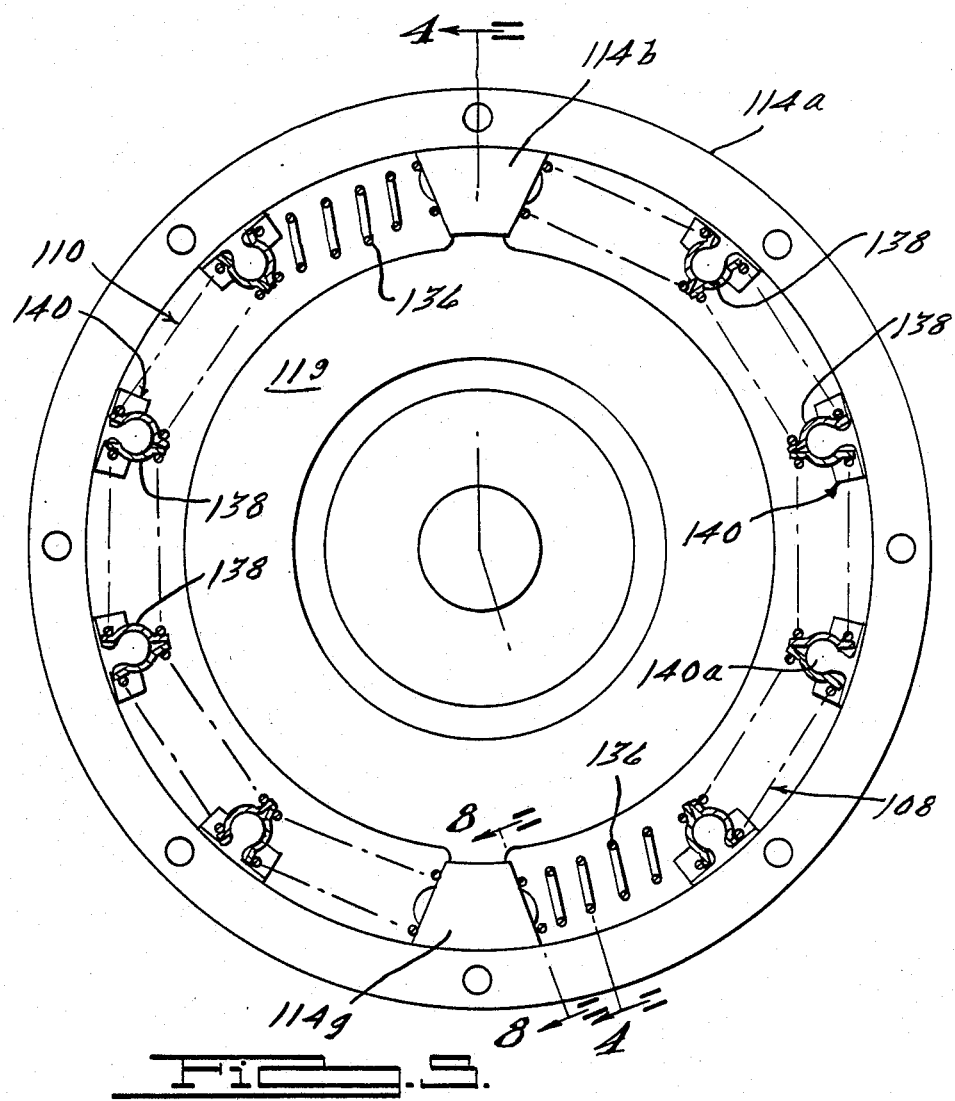

TORSION DAMPING ASSEMBLY

BACKGROUND OF THE INVENTION

This invention relate to driveline torsion damping assemblies operable over the entire operational range of a driveline. More specifically, the invention relates to such assemblies for vehicle drivelines.

It is well-known that the speed of an Otto or Diesel engine output or crankshaft varies even during so-called steady state operation of the engine, i.e., the shaft continuously accelerates and decelerates about the average speed of the shaft. The accelerations and decelerations are, of course for the most part, a result of power pulses from the engine cylinders. The pulses may be of uniform frequency and amplitude when cylinder charge density, air/fuel ratio, and ignition are uniform. However, such uniformity does not always occur, thereby producing pulses which vary substantially in frequency and amplitude. Whether uniform or not, the pulses, which are herein referred to torsionals, are transmitted through vehicle drivelines and to passengers in vehicles. The torsionals, which manifest themselves as vibrations, are detrimental to drivelines and derogate passenger-ride quality. Further, when an engine is abruptly accelerated and/or decelerated by accelerator pedal movement, torque pulses ring through the driveline and also derogate ride quality, such pulses are also referred to as torsionals.

Since the inception of the automobile, many torsion damping devices or schemes have been proposed and used to isolate and dampen driveline torsionals. For example, master clutches, used in combination with mechanical transmissions, have long employed springs and secondary friction devices to respectively isolate and dampen torsionals. Typically, torsional isolating or absorbing is provided by a plurality of circumferentially arrayed, coil springs disposed in parallel between the master clutch primary friction input and splined output; damping is provided by secondary friction surfaces biased together with a predetermined force and disposed in parallel with the springs. The surfaces slip when the amplitude of the torsionals exceeds the breakaway or slip torque of the secondary friction surfaces. With this arrangement, any portions of the torsionals less than the slip torque of the secondary friction surfaces are transmitted directly through the clutch without flexing or isolation by the springs, i.e., the arrangement provides neither torsion isolation nor damping. If the slip torque of the secondary friction surfaces is reduced by design or wear of the surfaces, damping is reduced. Further, any portions of the torsionals greater than the spring energy absorption or storage capacity are also transmitted directly through the clutch. If the spring rate is increased to provide greater storage capacity and prevent spring collapse, the springs transmit lesser amplitude torsionals directly through with little or no effective isolation or absorption of the torsionals.

To increase the operational spring range and storage capacity of a torsion damping assembly, Wemp in U.S. Pat. No. 1,978,922, proposed using a low spring rate torsion sleeve capable of flexing substantially more than the coil springs used with master clutches. This arrangement, like the master clutch arrangement, also employs secondary friction surfaces disposed in parallel and biased together with a predetermined force to provide damping. Hence the arrangement also fails to provide isolation and damping of torsionals below the slip or breakaway torque of the secondary friction surfaces and is also undercharged if the slip or breakaway torque of the secondary friction surfaces is reduced.

The advent of torque converter type automatic transissions ushered in a whole new perception of torsional damping and, of course, passenger ride quality. While torque converters have many advantages, one being torsional damping, they embody inherent slip and, therefore, inherent losses in vehicle fuel economy. In an effort to minimize this slippage and thereby optimize or improve fuel economy, various efforts have been made to bypass the torque converter with some manner of direct drive which is typically brought into play when a vehicle is operating in the higher speed ratios of the transmission. While these direct-drive bypass arrangements have resulted in fuel economy improvement, they have also brought back driveline vibration with resultant derogation in the vehicle ride quality that passengers have become accustomed to over the years. The direct drive bypasses, for the most part, have been in the form of master type friction clutches with torsion damping devices similar to the previously mentioned devices. One example of such a bypass is disclosed in U.S. Pat. No. 4,194,604. Two further examples of bypass drives are disclosed in U.S. Pat. Nos. 3,977,502 and 4,317,510. In the '502 patent, the master type clutch engagement force is such that the clutch continuously slips or slips in response to torsionals above a predetermined amount. This arrangement is difficult to control since the engagement force must vary with driveline torque. In the '510 patent, the master clutch incorporates a viscous coupling which continuously slips to dampen torsionals in a manner analogous to the continously slipping clutch in the '502 patent. With the arrangement in both of these patents, substantially all of the energy from the engine to the transmission must be transmitted across slipping surfaces; hence, both arrangements generate substantial amounts of heat and, of course, losses in the form of fuel economy. A third bypass arrangement, as disclosed in U.S. Pat. No. 4,138,003, includes the master type clutch in combination with low-rate torsion isolation springs which may be of the helical torsion type or of the torsion bar type, analogous to the arrangement disclosed in previously mentioned U.S. Pat. No. 1,978,922.

SUMMARY OF THE INVENTION

An object of the present invention is to provide a torsion damping assembly which is effective to isolate and dampen driveline torsionals over substantially the entire operational range of the driveline.

Another object of the present invention is to provide such an assembly, which may be used with many different types of transmissions.

Another object of the present invention is to provide such an assembly, which is both efficient and reliable.

According to a feature of the invention, the torsion damping assembly of the present invention is adapted for installation in a driveline having an input drive and an output drive respectively driven by an engine and driving a load. The torsion damping assembly is disposed between the drives and includes a torsional energy isolating spring(s) and a torsional energy damping device disposed in parallel with the spring; the spring is connected at its opposite ends to the drives and allows limited relative rotation between the drives.

According to another feature of the invention, the torsion damping assembly includes isolating and damping means adapted for connection between input and output drives of a driveline. The isolating means includes resilient means operative to transmit driveline torque between the drives and to allow limited relative rotation of the drives in response to torsionals in the driveline torque. The damping means is operative to dissipate the torsionals in response to the relative rotation. The improvement comprises a housing member and a clutch member respectively adapted for fixed driving connection with the drives; the housing member defines a compartment containing a viscous fluid; the clutch member includes a portion disposed in the compartment for rotation relative to the housing member; the resilient means is drivingly disposed in the compartment between the housing member and clutch member portion for allowing the relative rotation in response to the torsionals; and the viscous fluid dampens the torsionals in response to the relative rotation.

A viscous coupling defines the damping device; the coupling includes a rotatably mounted housing member driven by one of the drives and defining a chamber containing a viscous fluid, and a second rotatably mounted clutch member drivingly connected to the other drive and having a portion disposed in the chamber for viscous clutching coaction with the housing member and energy damping in response to relative rotation between the drives.

BRIEF DESCRIPTION OF THE DRAWINGS

The torsion damping assembly of the present invention is shown in the accompanying drawings in which:

FIG. 1 is a schematic view of a portion of a motor vehicle driveline, including the torsion damping assembly of the present invention;

FIG. 2 is a chart showing clutch and brake engagement for shifting the transmission of FIG. 1;

FIG. 3 is a partial, detailed, sectional view of a transmission shown in FIG. 1 with the torsion damping assembly also shown in detail;

FIGS. 5 and 6 are partially sectioned views of the assembly in FIG. 4 looking along staggered line 5—5 of FIG. 4;

DETAILED DESCRIPTION

Figure 7:
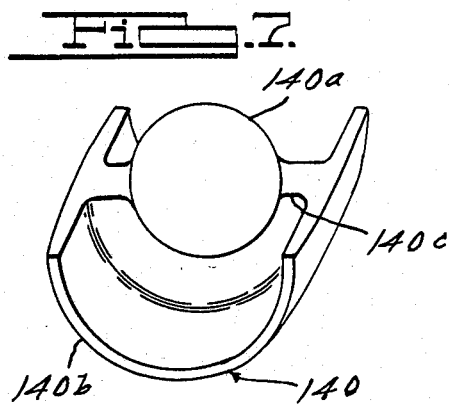
FIG. 7 is a perspective view of a part in FIGS. 5 and 6.
Figure 4:
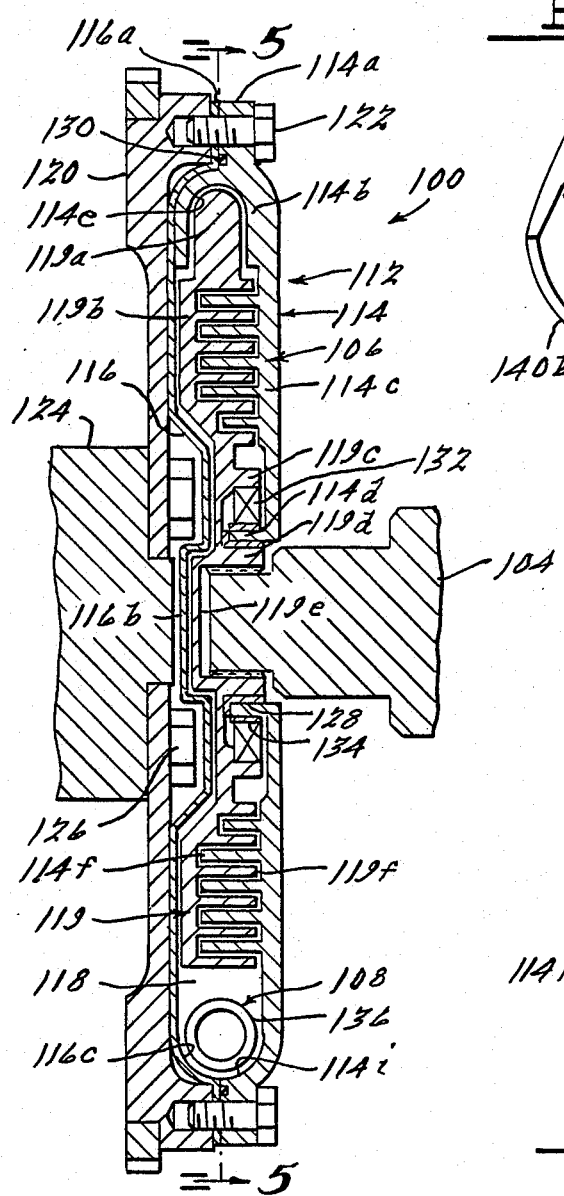
FIG. 4 is a detailed sectional view of a second embodiment of the torsion damping assembly looking along line 4—4 of FIG. 5.
Figure 8:
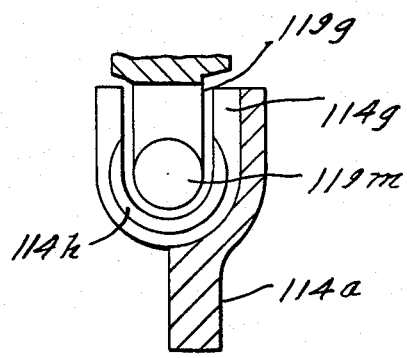
FIG. 8 is a partial view of a part in FIG. 5 looking along line 8—8.

The motor vehicle driveline, seen schematically in FIG. 1, includes an internal combustion engine 10 and an automatic transmission 12 having an output drive or gear 14 for driving a load, such as unshown rear and/or front wheels of a vehicle.

The transmission 12 comprises a hydrokinetic fluid coupling or torque converter 16, a ratio section 18, and a torsion damping assembly including a torsion shaft 20 and a viscous coupling 22. Components 16–22 are substantially symmetrical about a rotational axis defined by torsion shaft 20 and are, therefore, shown only above the axis for simplicity and brevity.

Torque converter 16 is disposed within a torque converter housing 24 rotationally driven by an input drive 26 connected directly to an output or crankshaft 28 of the engine. Converter 16 may be of any well-known type and includes an impeller 30, driven by housing 24, a turbine 32 driven hydrodynamically by the impeller, and a stator 34 connectable by a one-way roller clutch 36 to a ground, such as a nonrotatable portion of the unshown transmission housing.

Transmission 12 is a modified form of the general known class of split input torque transmissions disclosed in U.S. Pat. No. 4,398,436 and British Patent Application No. 2,099,091A, both of which are incorporated herein by reference. Ratio section 18 comprises a planetary gear set 38 controlled by friction clutches CL-1, CL-2, one-way clutch OWC-1 and brakes B-1, B-2 to provide a reverse and three forward speed ratio modes of operation. Planetary gear set 38 includes a first sun gear 40, first and second sets of planetary gears 42, 44 supported by a common planet carrier 46, a ring gear 48, and a second sun gear 50. Sun gear 40 is connectable to a first quill or torque converter drive-shaft 52 via clutch CL-1 or clutch OWC-1. The first and second sets of planetary gears are in constant mesh with each other, with sun gear 40, and with ring gear 48, respectively. Planet carrier 46 is in constant or direct driving relation with output gear 14. Ring gear 48 is connectable to ground via brake B-1 or to torsion shaft 20 and a second quill shaft 54 via clutch CL-2. Shafts 20, 54 are fixedly interconnected at 56, and shaft 54 is connected to clutch CL-2 via a radially extending flange 58. Sun gear 50 is in constant mesh with planetary gears 42 and is connectable to ground via brake B-2. Ratio section 18 further includes an oil pump 60 which may be driven by torsion shaft 20.

Looking now at the torsion damping assembly, torsion shaft 20 is fixed at its input end 20a to input drive 26 and at its output end 20b to the ratio section at 56. Shaft 20 is preferably as long as practicable to allow as much relative rotation between its ends as possible without overstressing the shaft. Viscous coupling 22 includes an annular housing member 62, fixed at 64 to the input drive via torque converter housing 24, and a second member 66 fixed to quill shaft 54. Housing 62 defines a chamber 68 containing a viscous fluid, and member 66 includes a portion 66a in constant viscous clutching coaction with housing member 62. Members 62, 66 rotate relative to each other in response to deflections of torsion shaft 20. Member 66 is also clutchable to turbine 32 and quill shaft 52 via a one-way clutch OWC-2. Cluches OWC-1 and OWC-2 are preferably of the roller type. Maximum deflection of torsion shaft 20 and maximum relative rotation between members 62, 66 is limited by stops 70, 72 respectively fixed to housing 24 and to member 66. The stops are necessary only in applications where maximum torques or periodic torsionals will cause overstressing of torsion shaft 20. The stops are shown herein diametrically opposite of each other, thereby limiting deflections to about 180° in either direction. Of course, the amount of allowed deflections in either direction may be varied by merely changing the stop positions or by adding stops.

Operation of transmission 12 is in accordance with the FIG. 2 chart, showing clutch and brake engagements to effect the reverse and forward speed ratio modes of operation. In first and reverse, 100% of driveline torque is transmitted to the ratio section via the torque converter (T/C). In second and third, 100% of the driveline torque is transmitted via torsion shaft (T/S) 20. When the transmission is in third, clutch OWC-2 engages to provide a torque reaction for sun gear 40. While the transmission is in either second or third, driveline torsionals emanating from the engine are isolated by torsion shaft 20 and are dampened by the viscous clutching coaction between members 62, 66 of the viscous coupling. The damping occurs independent of the steady state torque in the driveline and independent of the magnitude of the torsionals, since the viscous clutching coaction between members 62, 66 of the viscous coupling is always proportional to the magnitude of the torsionals. That is, since members 62, 66 are viscously interconnected, the members will always slip and dampen pulses or torsionals capable of defecting torsion shaft 20.

Looking now at the detailed embodiment of FIG. 3 and particularly torsion damping assembly therein, this embodiment does not include stops 70, 72, but is otherwise substantialy the same as the schematically illustrated embodiment of FIG. 1. Torsion shaft 20 is fixed at end 20a to torque converter housing 24 via a spline connection with a bracket 74 welded at 76 to the housing. End 20b of the shaft is spline-connected at 56 to shaft 54. A rightward extension of the shaft has a hexagonal portion 20c received in a mating hexagonal opening in a bracket 60a. The bracket drives oil pump 60, shown schematically only in FIG. 1. Shaft 20 is formed of a spring material, such as spring steel, and includes a reduced diameter portion 20d dimensioned to provide the desired spring rate. By way of example, shaft 20 may be designed to flex 100° or more in response to a torque load of about 270 Nm (200 lb.-ft.). In general, larger spring deflections are desirable and obtainable with more exotic materials or by lengthening the torsion shaft or by providing another torsion shaft in series with shaft 20. For example, quill shaft 54, which is in series with torsion shaft 20, may be a torsion shaft.

The viscous coupling 22 is of a sandwich construction. The annular housing member 62 is composed of spaced annular sidewalls 78, 80 defining chamber 68. Sidewall 78 constitutes the main structural or load-carrying part of the housing and sidewall 80 constitutes a cover formed of a steel stamping. Sidewall 78 includes a radially outer peripheral portion 78a, fixed to converter housing 24 via a bracket 82 welded at 84, an intermediate or working portion 78b, and a radially inner portion 78c terminating in a hub portion 78d. Intermediate portion 78b is machined on its inner face to form a series of annular axially extending rings 78e radially separated by a series of annular grooves. Cover 80 includes a radially outer peripheral portion 80a held in position against sidewall 78 by a rollover 78f, an intermediate portion 80b, and a radially inner portion 80c terminating in an inwardly turned lip portion 80d.

The side of clutch portion 66a of member 66 confronting the working or grooved portion 78b of sidewall 78 is machined to form a series of annular axially extending rings 66b separated by a series of annular grooves. Rings 78e are interdigitally arranged with respect to rings 66b and viscous fluid filling the spaces between the rings provides the viscous clutching coaction therebetween. The radially inner portion of member 66 defines annular hubs 66c, 66d extending axially in opposite directions. The radially innermost portion of the member 66 defines an annular hub 66e fixed to an extension of the inner race 86 of clutch OWC-2 by bolts 88. Race 86 is splined to quill shaft 54. Hub portion 78d is journaled on an outer peripheral hub portion 86a of race 86.

Chamber 68 of the viscous coupling, as previously mentioned, is filled with a viscous fluid which may be a silicone liquid such as dimethyl polysiloxane. The liquid is prevented from escaping radially outwardly of the chamber by a seal 90. Leakage at the radially inner portion is prevented by a pair of double lip elastomer seals 92, 94 which are respectively pressed on hubs 66c, 80d and which run against steel sleeves 96, 98 respectively pressed on hubs 66d, 78, The seals also preclude leakage of automatic transmission fluid into the viscous coupling.

Looking now at the embodiment of FIGS. 4–8, therein is illustrated a torsion damping assembly 100, embracing the principles of the assembly of FIGS. 1 and 3 and which may be adapted for use with split input torque transmissions such as transmission 12. However, assembly 100 may be used with virtually any type of transmission, e.g., transmissions with or without torque converters, transmissions having step ratio gears or continuously variable ratios, etc.

Torsion damping assembly 100 is adapted to be disposed in an unshown transmission having a single input shaft 104 leading to an unshown ratio section of the transmission. Shaft 104 is an output drive with respect to assembly 100. The torsion damping assembly includes a viscous coupling portion 106 and a pair of spring isolator assemblies 108, 110 disposed within an annular housing member or assembly 112. The annular housing is composed of spaced annular side walls 114, 16 defining a compartment 118 containing a viscous liquid and a clutch member 119.

Sidewall 114 constitutes the main structural or load-carrying part of the housing and sidewall 116 constitutes a cover formed of a steel stamping. Sidewall 114 includes a radially outer peripheral flange 114a fixed to an engine flywheel 120 by a plurality of bolts 122, an abutment portion 114b forming part of the spring damping assemblies, a viscous working portion 114c, and a radially inner portion terminating in an axially extending hub portion 114d. Cover 116 includes a radially outer peripheral portion 116a held in position against sidewall 114 by flywheel 120. Cover 116 may be secured to sidewall 114 by other means, such as the roll-over disclosed in FIG. 3. Flywheel 120 is supported and driven by an input drive 124 fixed to the flywheel by a plurality of bolts 126. Drive 124 may be an engine output or crankshaft.

Clutch member 119 includes a radially outwardly extending arm portion 119a forming part of the spring isolator assemblies and extending into a U-shaped cutout 114e in abutment 114b, a viscous working portion 119b, and a radially inner portion defining an annular axially extending flange portion 119c and an annular axially extending hub portion 119d. The inner periphery of hub portion 119d is splined to shaft 104 and the outer periphery has a sleeve 128 pressed thereon for journaling the inner periphery of hub portion 114d.

Chamber 118, as previously mentioned, is filled with a viscous fluid which may be a silicone liquid such as dimethyl polysiloxane. The liquid is prevented from escaping radially outward of the chamber by a static seal 130. Leakage at the radially inner portion is prevented by a single dynamic seal 132 of the double tip elastomer type pressed at is outer periphery on the inner periphery of flange 119c and running on its inner periphery against a sleeve 134 pressed on the outer periphery of hub portion 119d. The need of a second dynamic seal, as in the coupling of FIG. 3, is negated by the design of cover 116 which is continuous or unopen at its center 116b. Further, the need of a second static seal at the spline connection between shaft 104 and hub portion 119d is negated by a flange portion 119e which may be integrally formed with clutch member 119, as shown, or which may be provided as a plug pressed into the bore defined by hub portion 119d. Accordingly, torsion damping assembly 100 is a totally self-contained assembly which, when secured together by a rollover to secure cover 116 to sidewall 114, may be readily installed as a ready-to-use unit. Further, the single dynamic seal feature substantially reduces the probability of leakage.

With respect to the viscous coupling 106 of assembly 100, working portion 114c of sidewall 114 is machined on its inner face to form a series of annular axially extending rings 114f radially separated by a series of annular spaces or grooves. The working portion 119b of clutch member 119 confronting rings 114f is machined to form a series of annular axially extending rings 119f separated by a series of annular spaces or grooves. Rings 114f are interdigitally arranged with rings 119f to define, in a well-known manner, a viscous working chamber to effect viscous clutching coaction between sidewall 114 and clutch member 119 in response to relative rotation therebetween.

Figure 6:
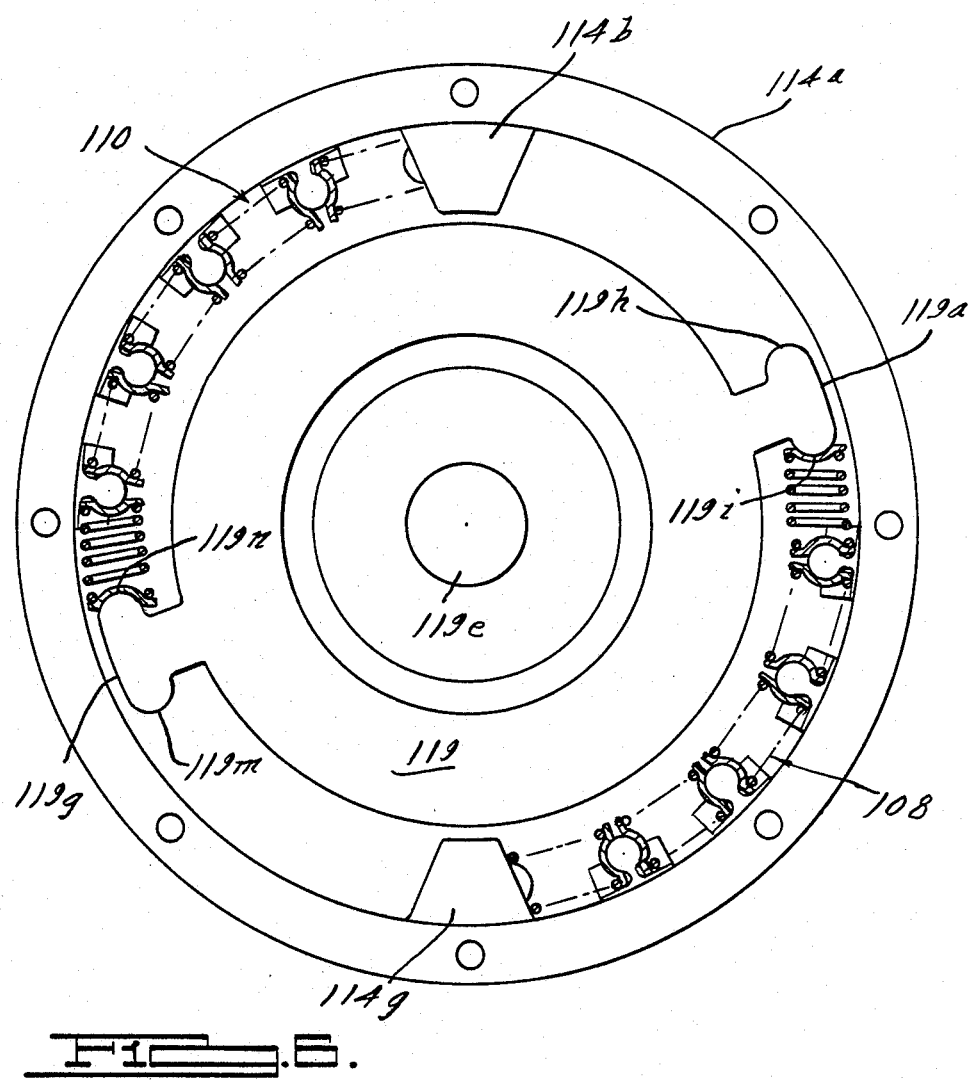

Looking now primarily at the spring isolator assemblies 108, 110 in FIGS. 5 and 6, the views therein are with cover 116 removed and with the spring assemblies partially sectioned. The assemblies are identical, are disposed in parallel with respect to the viscous coupling, and are disposed in parallel with respect to each other. Each assembly includes a plurality of helical coil springs 136 disposed end-to-end in series between two abutments 114b, 114g, a reaction plate 138 positioned at each spring end, a plurality of slide members 140 each having a spherical portion 140a disposed between juxtaposed ends of the springs in series and received by a dished portion in each plate 138, and arm portions 119a, 119g integrally formed with clutch member 119 and disposed between juxtaposed ends of the spring assemblies. The reaction plate at each end of the spring assemblies is received in a counterbore or seat in the oppositely directed faces of abutments 114b, 114g. One of the seats 114h may be seen in FIG. 8. Each arm includes oppositely facing, hemispherically shaped portions 119h, 119i, 119m, 119n received by the dished portions of plates 138 disposed at the opposite end of each spring assembly.

Each slide member 140, as may be seen in the enlarged perspective view of FIG. 7, includes the spherical portion 140a, a U-shaped wall portion 140b, and a web portion 140c. The outer surface of U-shaped wall portion 140b is formed to slidably mate with the curvature of an annular, U-shaped, radially inwardly facing surface defined by inner surface portions 114i, 116c of sidewall 114 and cover 116, respectively. A cross section of the surface defined by portions 114i, 116c may be seen in the lower portion of FIG. 4. Slide member 140 is not shown in FIG. 4.

The springs of assembly 100 are preferably preloaded to some minimum value; hence, the sum of the free lengths of the five springs in each spring assembly is greater than the arc length between the faces of abutments 114b, 114g. The springs may have the same rate or different rates. The springs may be greater or less in number, e.g., a single spring 136 may be used in each spring assembly. A single spring assembly may be used in lieu of two in parallel. And slide members 140 may be configured to provide the function of reaction plates 138.

Looking now at the operation of torsion damping assembly 100 with rotation and torque to the assembly provided by input drive 124 in a counterclockwise direction, torque is transmitted in parallel from abutments 114b, 114g to clutch member 119 via spring assemblies 108, 110. The so-called steady state or average value of input drive torque, as previously mentioned, is between the instantaneous torque values. The springs in each spring assembly assume an average length proportional to the average torque and then fluctuate in length in proportion to the effective rate of the springs and in proportion to the amplitudes of the torsionals above and below the average values. Fluctuations in the spring lengths induce or effect rotation of sidewall member 114 relative to clutch member 119. The relative rotation is dampened by the viscous clutching coaction between the members 114, 119. Accordingly, spring assemblies 108, 110, temporarily isolate or store a portion of the torsional energy and the viscous coupling dampens or dissipates a portion of the torsional energy.

The torsion damping assemblies, as disclosed herein, provide torsion damping for both clockwise and counterclockwise directions of rotation and torque without any modification of the assemblies. Further, both of the assemblies employ a viscous coupling requiring virtually no breakaway torque to effect damping or torsional energy dissipation as do prior art devices employing friction surfaces biased together. Accordingly, assemblies 20, 22 and 100 are operative or effective over the entire torque range between the actual force preload and maximum force capacity of the springs. Still further, since the viscous couplings require virtually no breakaway torque and also provide damping in proportion to the rate and amount of relative rotation between members of the viscous couplings, the operational range of the torsion damping assembly may be made greater than in prior art torsion damping assemblies without causing underdamping, as would be the case in the prior art if the breakaway torque of a friction clutch were reduced.

The two torsion damping assembly embodiments have been disclosed for illustrative purposes only. Many variations of the disclosed embodiments are believed to be within the spirit of the invention disclosed herein. For example, a torsion shaft may be placed in series with shaft 20 of assembly 10 and other types of springs may be used in lieu of or in combination with the torsion shaft and coil springs, i.e., flat spiral springs of the clock spring type. The following claims are intended to cover the invention portions of the disclosed embodiments and modifications believed to be within the spirit of the inventions therein.

What is claimed is:

1. In an assembly adapted for connection between input and output drives of a torque transmitting driveline, the assembly including torsional energy isolating means and damping means disposed in parallel connection, the isolating means operative when connected between the input and output drives to transmit driveline torque between the drives and allow limited relative rotation of the drives in response to torsionals in the driveline torque, the improvement comprising:

a viscous coupling defining the torsional energy damping means, said coupling including a rotatably mounted housing member defining a chamber containing a viscous fluid and a second rotatably mounted member having a portion disposed in the chamber for viscous clutching coaction with the housing, said housing member and second member respectively connectable with one of the drives and operative to dampen said torsionals by the viscous clutching coaction in response to the isolating means allowing relative rotation of the drives said rotatably mounted housing member disposed for rotation about an axis and connectable at its outer periphery to one of the driveline drives, said housing member including first and second sidewalls extending radially outward of said axis to define said chamber, said first sidewall having a closed central portion extending across said axis, said second sidewall having open central portion allowing connection a said second member to the other drive of the driveline, and said chamber sealed against leakage by a dynamic seal sealingly interposed between said second rotatably mounted member and said second sidewall, whereby said chamber is sealed by a single dynamic seal.

2. The assembly of claim 1, wherein the isolating means includes helical coil spring means.

3. The assembly of claim 1, wherein the isolating means includes helical coil spring means disposed in series.

4. The assembly of claim 3, wherein the helical coil spring means are disposed within the housing member.

5. The assembly of claim 1, wherein the isolating means includes a torsion shaft.

6. The assembly of the claim 5, further including stop means for limiting the amount of relative rotation between the drives.

* * * * *